United States Patent [19]
Schmader

[11] 3,720,981
[45] March 20, 1973

[54] METHOD AND APPARATUS FOR REMOVING WORMS AND PARASITES FROM THE FLESH OF FISH

[76] Inventor: Joseph M. Schmader, Hunts Point Road, Cape Elizabeth, Maine 04107

[22] Filed: May 4, 1972

[21] Appl. No.: 250,179

[52] U.S. Cl. .................................................. 17/45
[51] Int. Cl. ............................................... A22b 3/00
[58] Field of Search ........................ 17/45, 1 R, 1 C

[56] References Cited

UNITED STATES PATENTS

| | | | |
|---|---|---|---|
| 3,570,047 | 3/1971 | Bartels | 17/45 |
| 3,380,114 | 4/1968 | Hartl et al. | 17/45 |

Primary Examiner—Antonio F. Guida
Assistant Examiner—D. L. Weinhold
Attorney—Abbott Spear

[57] ABSTRACT

The invention is concerned with the removal of such objects as worms and parasites from the flesh of a fish after it has been cleaned and so prepared that it is sufficiently translucent to enable any such objects to be observed when the thus prepared fish is held against a light source of predetermined minimum intensity. The sharpened end of a cannula is inserted in the flesh in a position to expose the object which is then sucked therefrom and discharged into a collector. The vacuum is regulated to be within a predetermined range. Both method and apparatus are disclosed.

19 Claims, 6 Drawing Figures

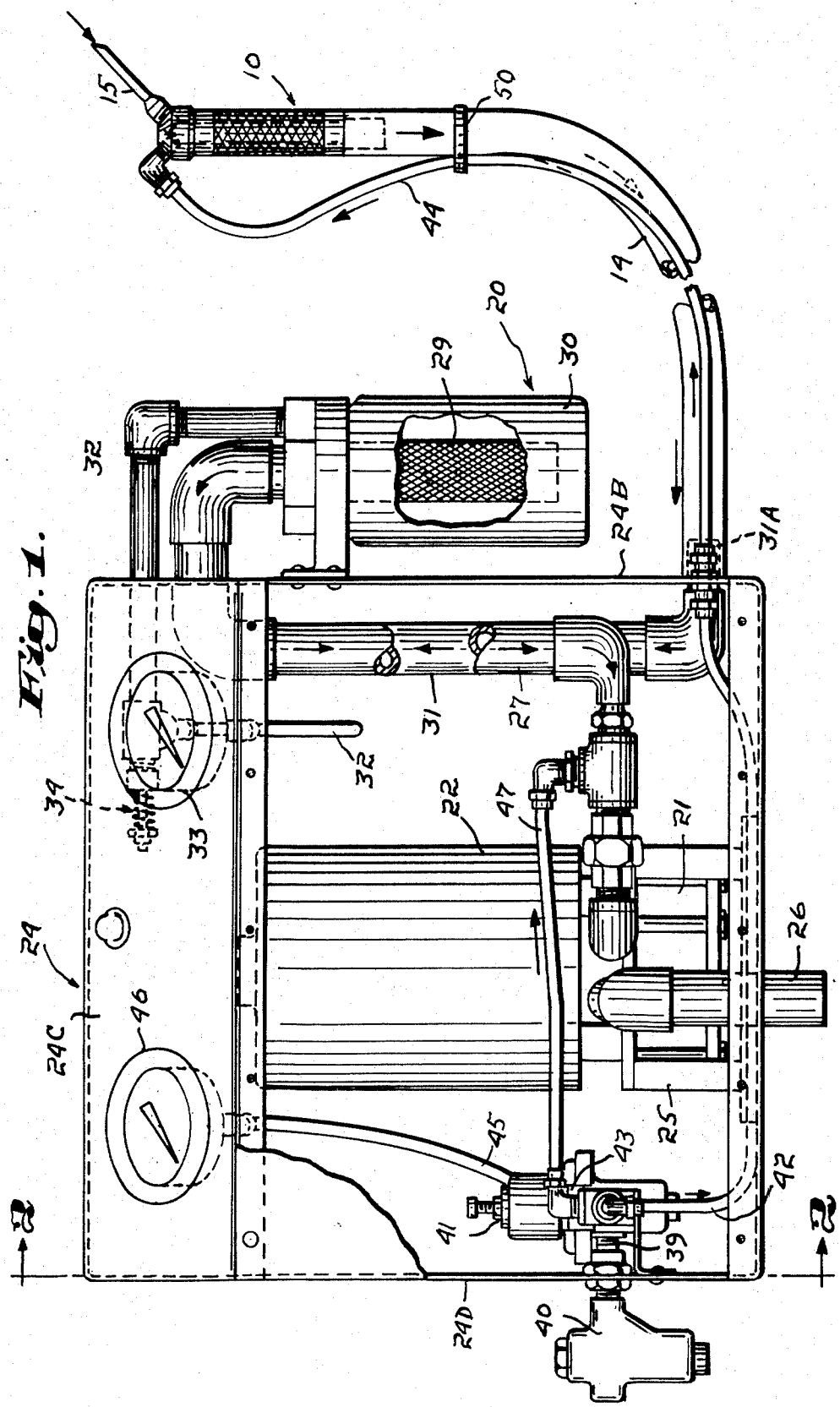

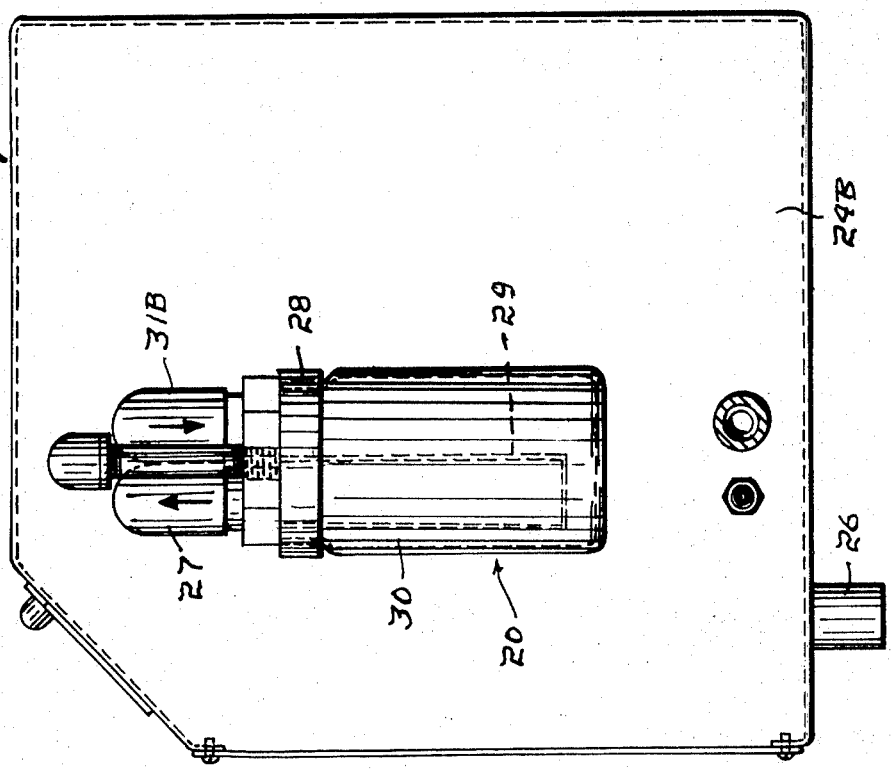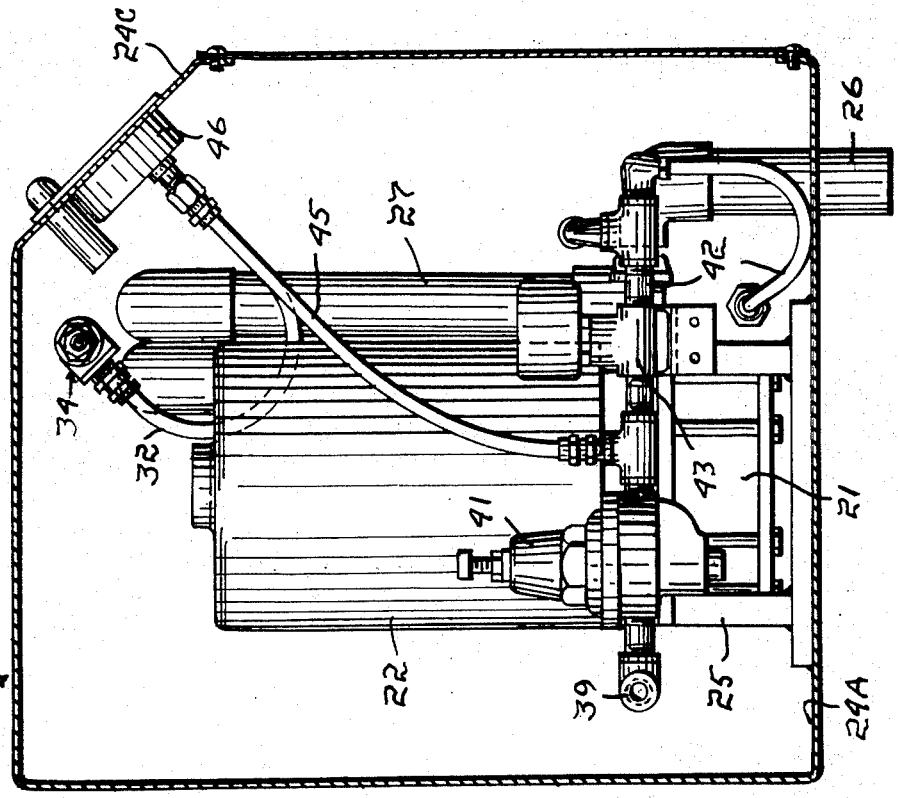

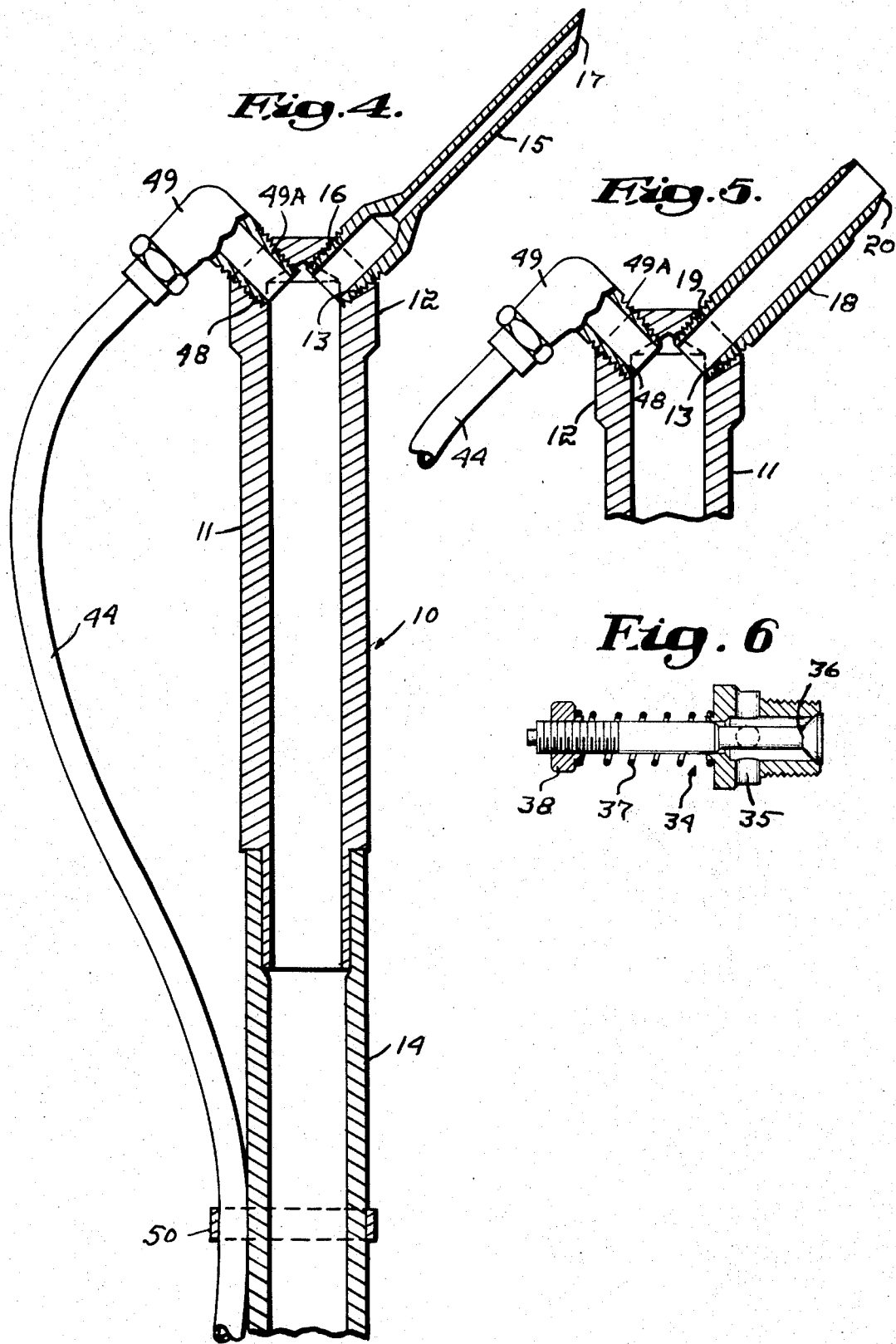

3,720,981

METHOD AND APPARATUS FOR REMOVING WORMS AND PARASITES FROM THE FLESH OF FISH

BACKGROUND OF THE INVENTION

In the preparation of fish fillets, for example, it has become necessary to examine them, some for parasites and some for worms, on translucent tables that are illuminated from below. The present practice is to cut out the flesh that contains parasites which are usually located in the outer sides of the flank areas and to dig out the worms which may be found in any part of the flesh. Both procedures are attended by the loss of flesh and also affect the appearance of the fillets. In addition, in digging the worms out of the flesh, it sometimes happens that broken sections remain in the flesh and sometimes removed objects present on the tables come again in contact with the fillets and are packaged therewith.

THE PRESENT INVENTION

The principal objective of the present invention is to provide for the removal by suction of worms and parasites from fish, particularly fillets, when held against a lighted area of sufficient intensity to make such objects visible and to collect the withdrawn worms and parasites while reducing to a minimum loss of flesh and any indications that the flesh once harbored any such object.

I am aware that suction operated devices have been proposed for use in cleaning poultry, see U.S. Pat. No. 2,448,693 for one example, and that aspirating instruments are widely used in the medical field, see U.S. Pat No. 3,589,363 for an interesting example. As far as I am aware, no proposal in either field is adaptable for the use in the removal of worms and parasites from the flesh of fish.

In accordance with the invention this objective is attained by piercing the flesh with the sharpened end of a cannula whose inside diameter is such as to accommodate the particular type of object the flesh can be expected to contain, with the sharpened end held in a position to receive the object while simultaneously establishing and maintaining a suction in the cannula adequate to withdraw the object, once it is sufficiently exposed by the cannula and to carry the withdrawn objects away from the work area. While the vacuum may be in the approximate range of from 5 - 18 inches of mercury, best results are attained when the vacuum is in the upper part of that range, 15 - 18 inches of mercury.

In accordance with the invention, apparatus for carrying out this procedure has a hand-held instrument provided with a chamber with which an exhaust conduit is in communication. A cannula having a sharpened end is connected to the instrument with its other end in communication with said chamber. The exhaust conduit is a closed system having a separator in which the objects are collected and a pump operable to maintain a vacuum in the system continuously in the above referred-to range. In practice a water delivery conduit is also in communication with the chamber in order to provide means for flushing it.

THE PREFERRED EMBODIMENT OF THE INVENTION

A preferred embodiment of the invention is shown in the accompanying drawings of which:

FIG. 1 is a front view of the apparatus with its front wall partly broken away;

FIG. 2 is a section taken approximately along the indicated lines 2—2 of FIG. 1;

FIG. 3 is an end view of the container as viewed from the right in FIG. 1;

FIG. 4 is a section, on a substantial increase in scale, taken lengthwise of the hand-held instrument and the cannula employed in worm removal;

FIG. 5 is a fragmentary and similarly sectioned view of the instrument with a cannula attached thereto that is for use in parasite removal; and FIG. 6 is a section on an increase in scale, taken lengthwise of the adjustable vacuum relief valve.

The apparatus includes an instrument, generally indicated at 10 and shown as consisting of a tubular handle 11 having one end closed by a cap 12 and having a threaded tapered bore 13 and a flexible exhaust or suction conduit 14 connected to its other end. A cannula 15 has a tapered hub 16 threaded in the bore 14 with its sharpened end 17 preferably in the form of a bevel. The cannula 15 is for use in worm removal and is desirably in the neighborhood of three-eighths of an inch in diameter. In the event parasites are to be removed, the cannula 15 is replaced by the cannula 18, see FIG. 5, having a tapered threaded end 19 for entry into the bore 13 and a sharpened end 20 that is preferably circular. The cannula 18 is desirably in the neighborhood of seven-sixteenths of an inch in diameter.

The suction conduit 14 is part of a closed system including a generally indicated separator 21 and a pump 22 driven by an electric motor 23 and operable to establish and maintain a vacuum in the system and instrument in a desired range.

The pump 22 and its motor 23 are supported in a cabinet 24 by a mount 25 secured to the cabinet floor 24A with the pump outlet connected to a waste pipe 26 extending downwardly therethrough. The inlet of the pump 22 is connected to piping 27 extending through the upper part of the cabinet wall 24B and opening downwardly through the cover 28 of the separator and provided with a screen 29. The cover 28 is fixed to the side wall 24B and the mouth of a separator jar 30 is detachably secured and sealed thereto.

The cabinet 24 also supports a vertical pipe 31 having both its upper and its lower ends extending through the side wall 24B with the other end of the flexible conduit 14 secured to its lower end 31A and its upper end has a discharge section 31B opening downwardly through the cover 28. An air inlet pipe 32 also extends through the cover 28 into the cabinet 24 through the side wall 24B and is in communication with a vacuum gauge 33 mounted on the cabinet panel 24C and controlled by an adjustable relief valve generally indicated at 24 adapted to open when the vacuum in the system rises above the wanted level. The valve 34, see FIG. 6, has an inlet 35 closed by the valve member 36 under the influence of the spring 37 unless and until the resistance of the spring is overcome by an increase in the vacuum above a desired limit. The resistance of the spring 37 is adjustable by means of the nut 38 threaded on the exposed end of the valve member 36 to enable the desired vacuum limit to be established by reference to the gauge readings.

In practice the pump 22 is of the impeller type and in order that it may be water sealed and also to prevent the instrument from becoming clogged, the cabinet 24 has a water inlet 39 extending through the other end wall 24D provided with a strainer 40 and connected to an adjustable, pressure regulating valve 41 in a pipe 42. The pipe 42 is provided with a shut-off valve 43 and extends through the cabinet end wall 24B and a length of flexible tubing 44 is secured to its exposed end. Between the valves 41 and 43, the pipe 42 has a branch conduit 45 in communication with a pressure gauge 46 mounted on the cabinet panel 24C. A branch pipe 47 leads from the pipe 42 to the pump inlet piping 27 to ensure that the pump 22 is always water sealed in use.

The cap 12 also has threaded, tapered bore 48 with its axis and that of the bore 13 intersecting within the cap 12 at an angle in the neighborhood of 90°, each on the opposite side of the axis of the handle 11. An L-shaped fitting 49 has an appropriately tapered end 49A threaded in the bore 48 and the other end of the flexible tubing 44 secured thereto. In order that the instrument 10 may be used with maximum convenience a clamp 55 holds the tubing 44 against the exhaust conduit 14 closely adjacent the handle 11.

With the apparatus above described, the water flow is adjusted to provide a water flow through the delivery conduit 42 and the delivery tubing 44 both, in practice, quarter inch tubing, in the approximate range of from one-eighth to one-quarter grams per minute at 30 p.s.i as measured by the pressure gauge 46. This flow is adequate for flushing purposes and does not interfere with the ease with which the instrument 10 may be manipulated. As above stated, the pump 22 is, in practice, of the impeller type and is continuously water sealed but, in any event, any pump used must be capable of maintaining a vacuum in the instrument 10 in the approximate range of from 15 to 18 inches of mercury.

The use of a higher vacuum is objectionable because attended by a pull on the flesh that often results in the removal thereof and interferes with the free manipulation of the instrument. In accordance with the invention, a vacuum as low as 5 inches of mercury can be used but it usually requires too much "digging" with the cannula in withdrawing the objects with the result that the operation is slower and less efficient and the chances of a damaged appearance of the fillet are increased.

In use, the operator inspects the fillets against a light background of enough intensity to reveal parasites or worms in the flesh. Once such an object is located, the instrument is manipulated to enable its cannula to be inserted into the flesh until that object is exposed to the suction by which it is pulled from the flesh. In the case of worm removal, the cannula is of such small outside diameter that the flesh is usually not noticeably marked but even with the vacuum in the limit of its range, flesh loss is far less than that resulting from removal by digging or cutting. In the case of parasite removal, some flesh loss is experienced due to the larger diameter of the cannula employed and the flesh is accordingly marked but to a much lesser extent than when the parasites are cut from the flesh.

I claim:

1. Apparatus for use in removing objects such as worms and parasites from the flesh of a fish after it has been cleaned and so prepared that such objects may be observed when the flesh is held against a light of predetermined intensity, said apparatus comprising a hand-held member having a chamber, a cannula having a sharpened, flesh-entering end and connected to said tool with its other end in communication with said chamber, and means including a flexible exhaust conduit in communication with said chamber and operable to establish a vacuum therein in the approximate range of from 5 to 18 inches of mercury.

2. The apparatus of claim 1 in which the preferred portion of the vacuum range is in the order of from 15 to 18 inches of mercury.

3. The apparatus of claim 1 in which the vacuum establishing and maintaining means includes a pump of the impeller type, and means operable to deliver sealing water to said pump.

4. The apparatus of claim 1 and means including a flexible conduit connected to said member and in communication with its chamber and operable to deliver flushing water through the chamber and into the exhaust conduit.

5. The apparatus of claim 1 in which the vacuum establishing and maintaining means includes an unsealed pump, and means to deliver sealing water into said pump and flushing water through said chamber into the exhaust conduit.

6. The apparatus of claim 5 in which the delivery of flushing water through the chamber is continuous.

7. The apparatus of claim 1 in which the vacuum establishing and maintaining means establishes a closed system including said chamber, a pump, and a separator between said chamber and the inlet of said pump.

8. The apparatus of claim 7 and a water delivery conduit including a flexible section connected to the member and in communication with said chamber and controls for adjusting both the pressure and volume of the delivered water to ensure the flushing of the chamber without interfering with the freedom and ease with which the member is manipulated by the operator.

9. The apparatus of claim 8 in which the water flow through the chamber is in the approximate range of one-eighth to one-quarter grams per minute at about 30 p.s.i.

10. The apparatus of claim 9 in which the cross sectional area of the exhaust conduit is substantially greater than that of the delivery conduit.

11. The apparatus of claim 8 in which the water delivery conduit and the cannula are disposed relative to each other in a venturi establishing relation.

12. The apparatus of claim 1 in which the sharpened end of the cannula is bevelled.

13. The apparatus of claim 1 in which the sharpened end of the cannula is circular.

14. The apparatus of claim 1 in which the vacuum establishing means and maintaining means include a vacuum relief valve.

15. The apparatus of claim 7 and an air conduit in communication with the separator and a vacuum relief valve in control thereof.

16. The method of removing objects such as worms and parasites from the flesh of a fish after it has been cleaned and so prepared that such objects may be observed when the flesh is held against a light of predetermined minimum intensity, said method comprising the steps of directing the sharpened end of a cannula towards a detected object while maintaining an object-withdrawing suction in said cannula in the approximate vacuum range of from 5 to 18 inches of mercury, penetrating the flesh with the cannula until the object is exposed and sucked from the flesh and through the cannula, and delivering the withdrawn objects to a collecting station.

17. The method of claim 16 and the additional step of flushing the chamber with water.

18. The method of claim 16 in which the flushing step is continuous.

19. The method of claim 16 in which the vacuum selected from said range is in the order of 15 to 18 inches of mercury.

* * * * *